(12) United States Patent
Kilcrease et al.

(10) Patent No.: US 8,919,500 B1
(45) Date of Patent: Dec. 30, 2014

(54) MOTORCYCLE PRIMARY DRIVE COMPENSATOR HUB LUBRICATING SYSTEM

(76) Inventors: Richard Kilcrease, Wimberly, TX (US); Ronald W. Babos, Woodstock (CA)

(*) Notice: Subject to any disclaimer, the term of this patent is extended or adjusted under 35 U.S.C. 154(b) by 310 days.

(21) Appl. No.: 13/506,797

(22) Filed: May 17, 2012

(51) Int. Cl.
*F16H 57/04* (2010.01)
*F01M 9/06* (2006.01)

(52) U.S. Cl.
USPC ............................ 184/6.12; 184/11.5; 474/43

(58) Field of Classification Search
USPC ............... 474/43, 45, 91; 220/573; 184/6.12, 184/6.13, 6.27, 8, 11.1, 11.2, 11.3, 11.5, 184/15.1
See application file for complete search history.

(56) References Cited

U.S. PATENT DOCUMENTS

| | | | | | |
|---|---|---|---|---|---|
| 1,441,857 | A | * | 1/1923 | Johnson | 184/11.3 |
| 1,771,835 | A | * | 7/1930 | Bartlett | 184/15.1 |
| 1,783,978 | A | * | 12/1930 | Perry | 184/15.1 |
| 3,012,632 | A | * | 12/1961 | Bradley | 184/15.1 |
| 3,529,698 | A | * | 9/1970 | Nelson | 184/6.12 |
| 5,333,704 | A | * | 8/1994 | Hoff | 184/11.4 |
| 7,556,580 | B2 | * | 7/2009 | Saito et al. | 475/154 |
| 8,323,143 | B2 | * | 12/2012 | Schoon | 475/337 |
| 2005/0272551 | A1 | * | 12/2005 | Oates | 475/160 |
| 2008/0054004 | A1 | * | 3/2008 | Dudzinski | 220/573 |
| 2011/0214947 | A1 | * | 9/2011 | Tuomas | 184/6.12 |

* cited by examiner

*Primary Examiner* — William E Dondero
*Assistant Examiner* — Minh Truong
(74) *Attorney, Agent, or Firm* — Derek R. Van Gilder

(57) ABSTRACT

A motorcycle compensator-sprocket-wheel-hub lubricating system has a lubricant-collection plate (2) (30) attachable to a sprocket-gear housing (1) of a motorcycle for catching lubricant falling from a sprocket-wheel chain (4) and conveying the lubricant to a compensator-sprocket-wheel hub (33) which is provided with enhanced lubrication of rotating-contact and sliding-contact parts with lubricant conveyed from the lubricant-collection plate (2) (30).

9 Claims, 7 Drawing Sheets

Fig. 14
Fig. 15
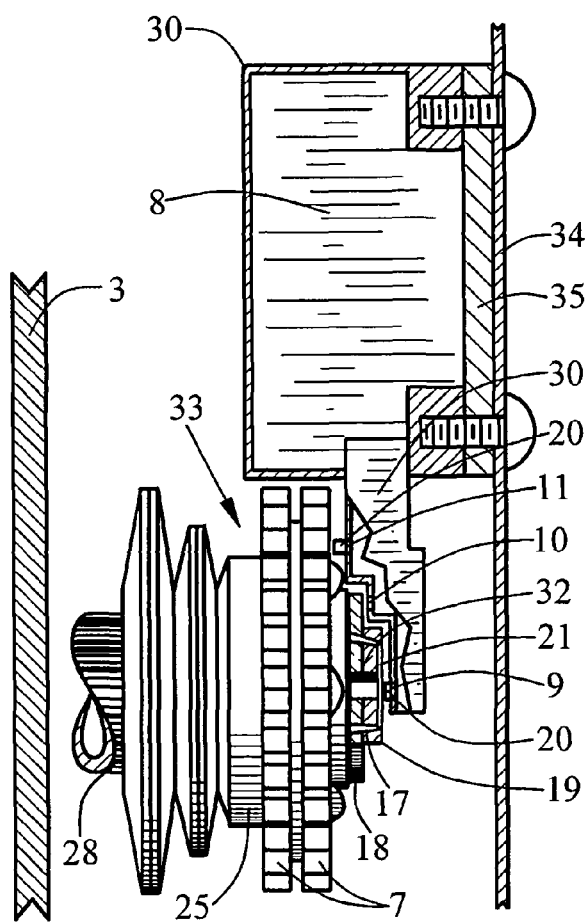
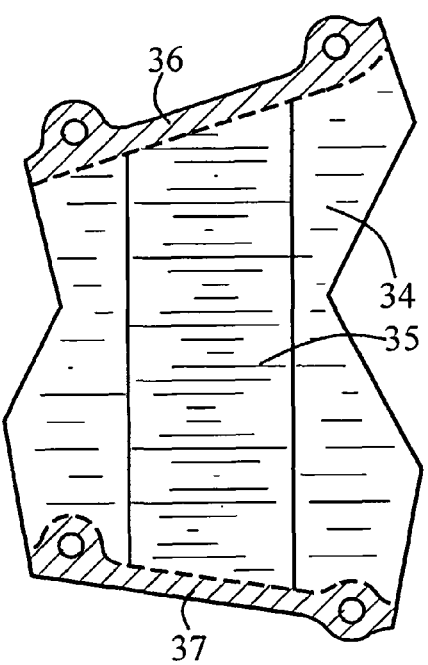

MOTORCYCLE PRIMARY DRIVE COMPENSATOR HUB LUBRICATING SYSTEM

1. FIELD OF THE INVENTION

This invention relates to lubricating systems for motorcycle primary drive compensator hubs.

2. BACKGROUND OF THE INVENTION

Primary drive compensator hubs of motorcycles wear out quickly because they do not have adequate lubrication of rotational and sliding parts of the primary drive compensator hub.

3. RELATION TO PRIOR ART

There is no known related prior art. Previously, motorcycle primary drive compensator hubs have been oiled by splash oil conveyed by a drive chain intermediate two sprocket wheels inside of a sprocket gear housing that contains the primary drive compensator. There is adequate oil splashed for oiling a sprocket chain and for oiling cogs of the sprocket wheels inside of the sprocket gear housing, but splashed oil does not get conveyed adequately to rotational-contact and sliding-contact parts of the primary drive compensator hub.

4. SUMMARY OF THE INVENTION

Objects of patentable novelty and utility taught by this invention are to provide a primary drive compensator hub lubrication system which:

can be attached to motorcycles as an after-market item;
can be produced by manufacturers of motorcycles as original equipment;
increases use life of motorcycle primary drive compensator hubs substantially; and
does not decrease motorcycle aesthetics.

This invention accomplishes these and other objectives with a lubricant-collection plate extended from a side wall of a sprocket-gear housing and has fluid-conveyance extensions of the lubricant-collection plate in predetermined fluid-conveyance communication to a primary drive compensator hub for providing conveyance of predetermined lubricant to sliding-contact and rotational-contact parts of the primary drive compensator hub.

5. BRIEF DESCRIPTION OF DRAWINGS

This invention is described by appended claims in relation to description of a preferred embodiment with reference to numbered parts of the following drawings which are explained briefly as follows:

FIG. 14 is a partially cutaway top view of an outside-wall lubricant-collection plate attached to an unfortified outside wall having fortification support of a portion of the outside wall; and FIG. 15 is a fragmentary partially cutaway side view of a fortification cross plate on an inside surface of the unfortified outside wall.

6. DESCRIPTION OF PREFERRED EMBODIMENT

A description of a preferred embodiment of this invention references the above drawings which include numbered terms designating features of the invention with the same numbers on the drawings and in parentheses throughout this description and throughout patent claims.

Figure 1:
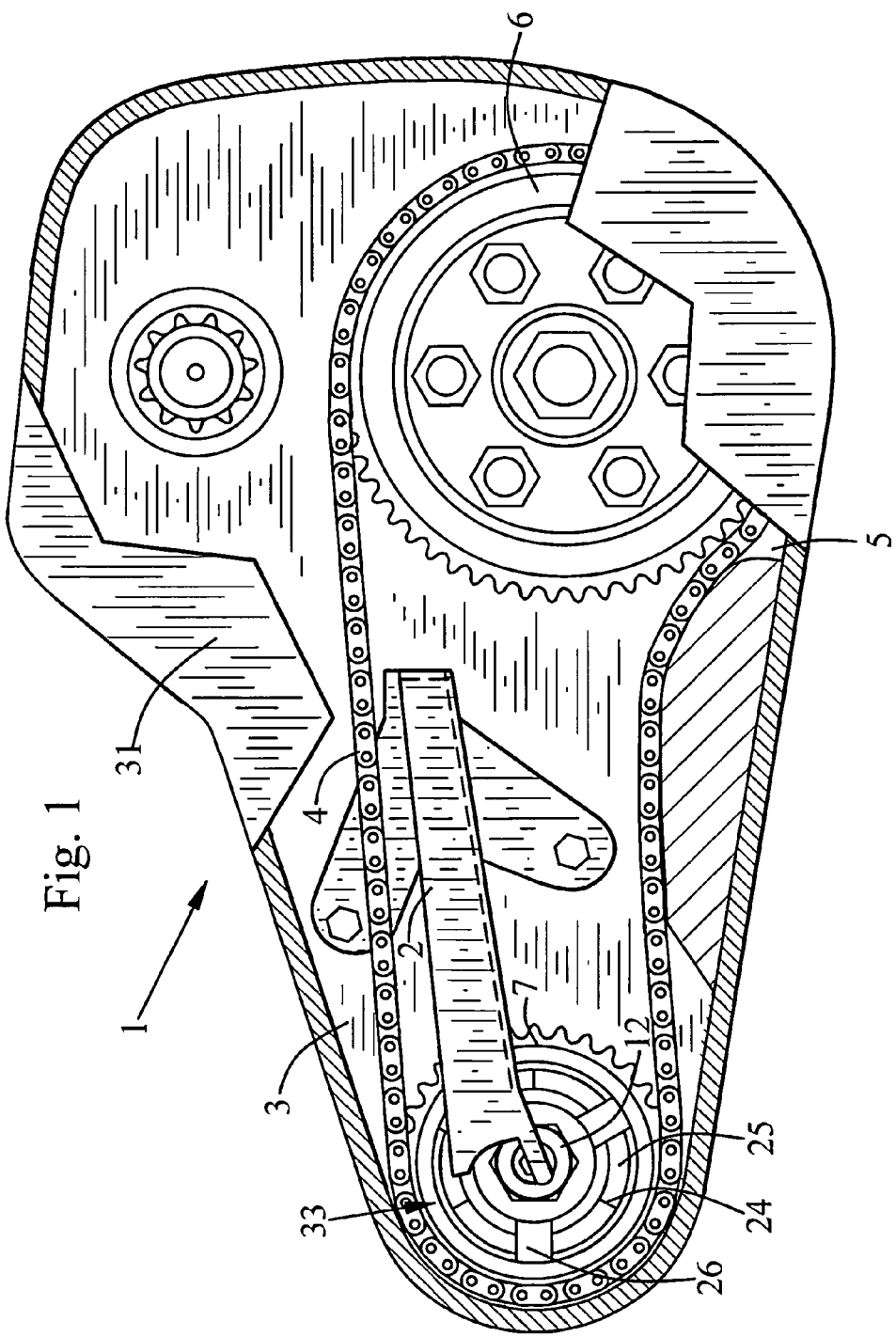
FIG. 1 is a partially cutaway side view of a compensator sprocket-wheel-gear housing in which a lubricant-collection plate is positioned vertically under a sprocket chain and has lubricant conveyance to rotating-contact and sliding-contact components of a compensator sprocket-wheel hub.

Referring to FIG. 1, a sprocket-gear housing (1) has a lubricant-collection plate (2) extended from an inside wall (3) of the sprocket-gear housing (1). The lubricant-collection plate (2) is positioned vertically under a sprocket chain (4) to collect lubricant (not shown) which falls from the sprocket chain (4) after the lubricant has been carried from a bottom portion (5) of the sprocket-gear housing (1) by the sprocket chain (4) in chain travel about a large sprocket wheel (6) and towards a compensator sprocket wheel (7) of a primary compensator (33).

Figure 2:
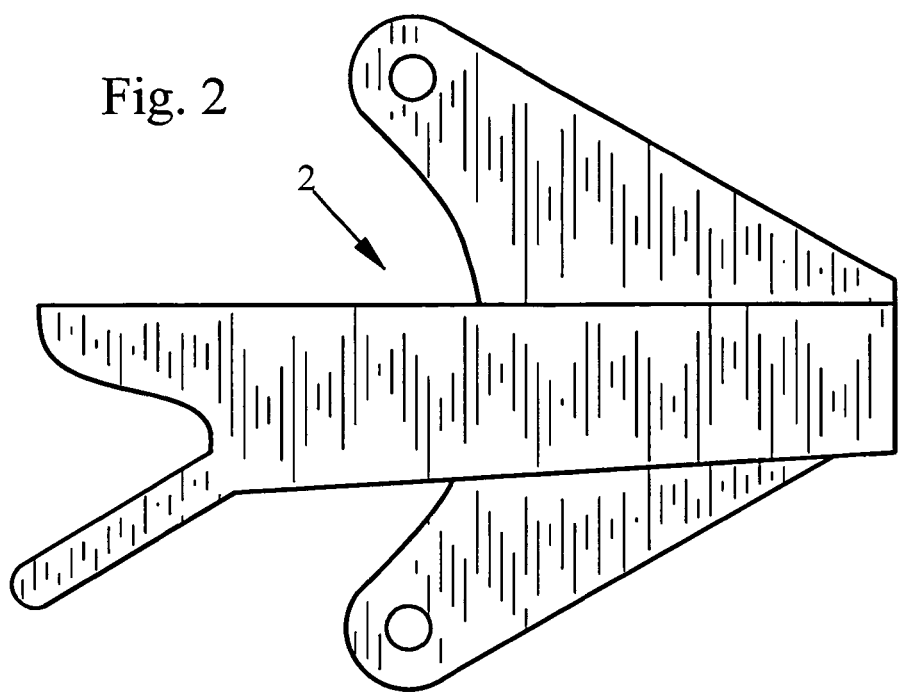
FIG. 2 is a side view of the lubricant-collection plate.
Figure 3:
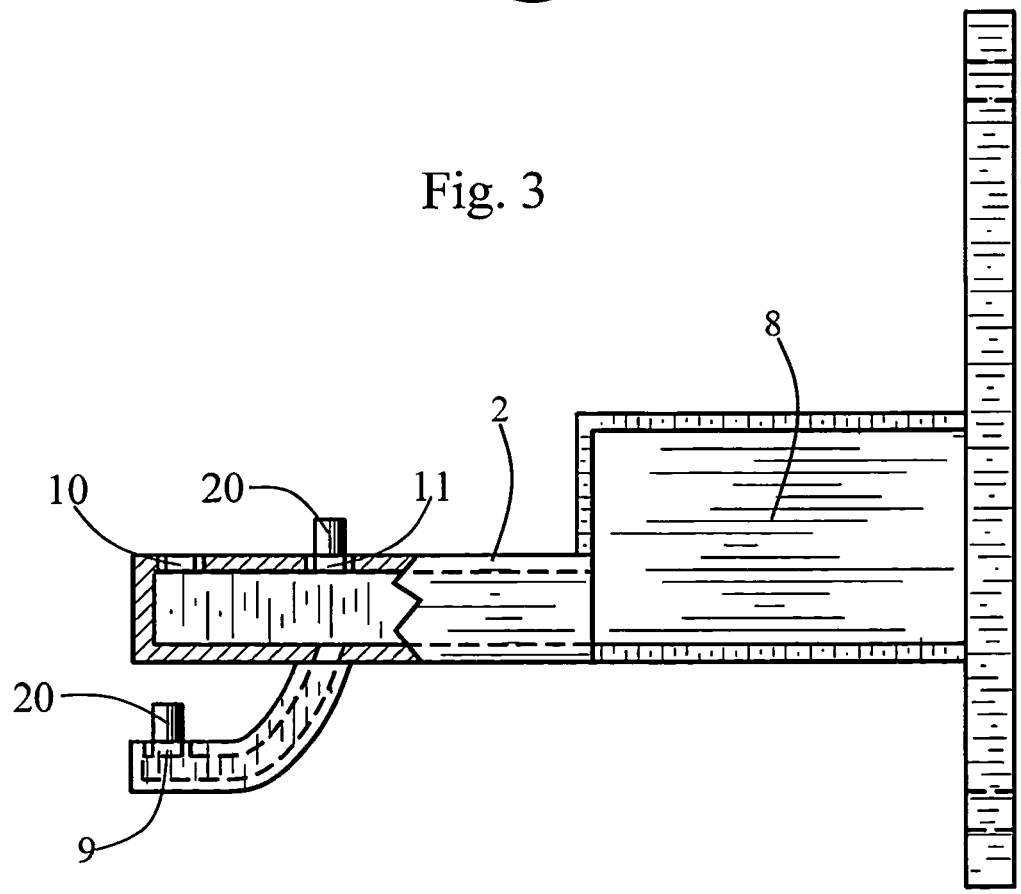
FIG. 3 is a partially cutaway top view of the lubricant-collection plate.

Referring to FIGS. 1-3, the lubricant-collection plate (2) has a collection bay (8) with fluid conveyance to a retainer-lubrication outlet (9), to a cam-lubrication outlet (10) and to a spline-lubrication outlet (11). The collection bay (8) is predeterminedly wide and long enough to collect sufficient lubricant that falls from the sprocket chain (4) and from a top of the sprocket-gear housing (1) for conveying a sufficient quantity of lubricant to the retainer-lubrication outlet (9), to the cam-lubrication outlet (10) and to the spline-lubrication outlet (11) for lubricating rotational-contact and sliding-contact parts of the compensator-sprocket-wheel hub (33). The entire lubricant-collection plate (2) is designedly slanted downwardly intermediate the large sprocket wheel (6) and the compensator sprocket wheel (7) for causing gravitational flow of lubricant therein to the retainer-lubrication outlet (9), to the cam-lubrication outlet (10) and to the spline-lubrication outlet (11). Lubricant tubes (20) having a predetermined length can be positioned on the retainer-lubrication outlet (9), on the cam-lubrication outlet (10) and on the spline-lubrication outlet (11) as desired to convey lubricant from the lubricant-collection plate (2) to desired parts of the compensator-sprocket-wheel hub (33).

Figure 4:
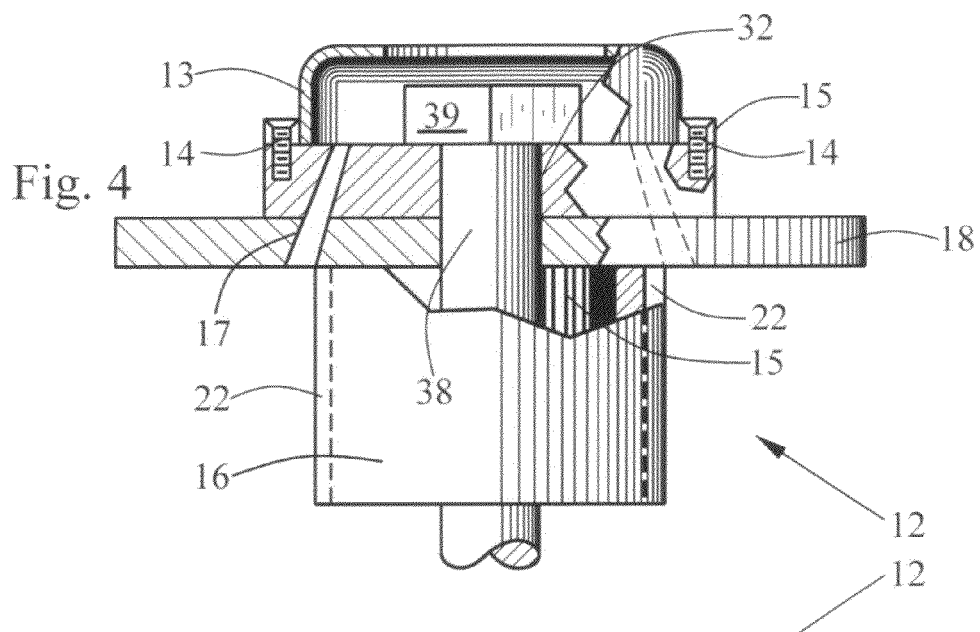
FIG. 4 is a partially cutaway side view of a circumferentially walled lubricant-conveyance sprocket retainer.
Figure 5:
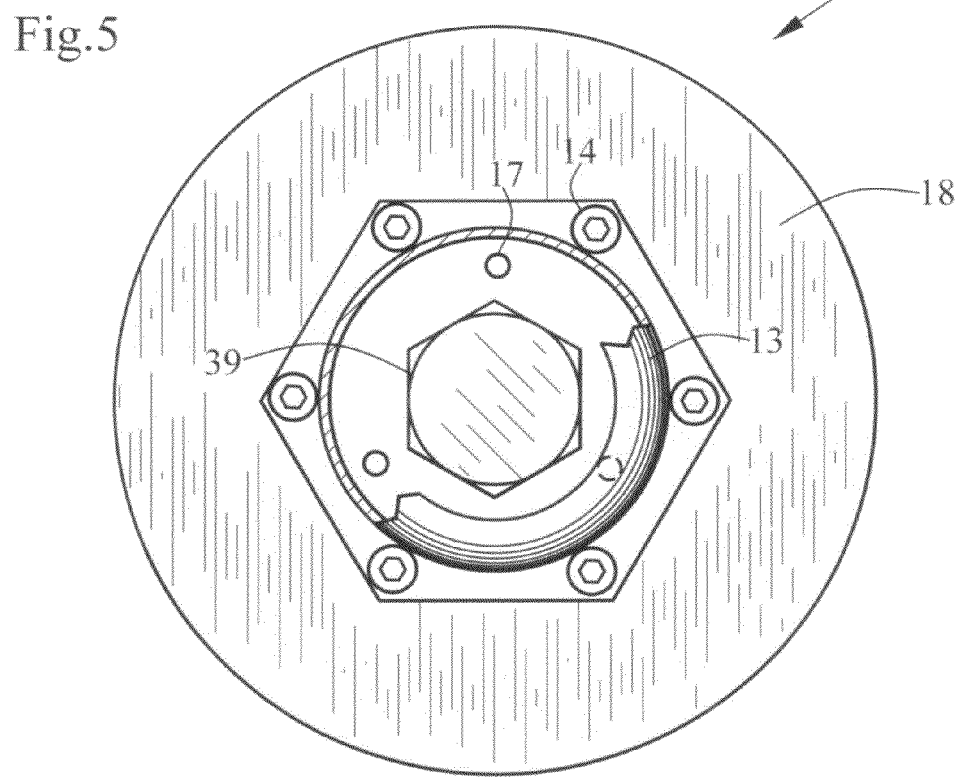
FIG. 5 is a partially cutaway end view of the circumferentially walled lubricant-conveyance sprocket retainer.

Referring to FIGS. 4-5, a hex sprocket retainer, which is optionally a walled hex sprocket retainer (12), has a circumferential containment wall (13) for containing and directing lubricant from the lubricant-collection plate (2) to at least one retainer-extension lubrication orifice (17) that is in fluid-conveyance communication to an outside periphery of a cylindrical retainer extension (16). The retainer-extension lubrication orifice (17) can be predeterminedly tapered outwardly from a minor diameter within the circumferential containment wall (13) to a major diameter at the cylindrical retainer extension (16).

The circumferential containment wall (13) can be attached to the walled hex sprocket retainer (12) with fastener screws (14) selected for fastening a wall flange (15) of the circumferential containment wall (13) to the walled hex sprocket retainer (12).

An optional fluid groove (22) having preferably slanted or outwardly curved walls is provided for allowing predeterminedly viscose oil or lubricative-particle-based lubricant to be conveyed for positioning intermediate an outside diameter of the cylindrical retainer extension (16) and an inside diameter of the compensator sprocket wheel (7) for predetermined lubrication to minimize wear by minimizing or preventing direct rotational contact of an outside surface of the cylindrical retainer extension (16) and an inside surface of the compensator sprocket wheel (7). The fluid groove (22) is in fluid communication with an exit end of the retainer-extension lubrication orifice (17).

A hex flange screw (38) in a hex screw orifice (32) in the walled hex sprocket retainer (12) has a hex head (39) with predetermined height and width for acceptance of a socket wrench to rotate the hex flange screw (38) in rotational opposition to a wrench engaged with the walled hex sprocket retainer (12) for tightening and loosening the hex flange screw (38) selectively.

Figure 6:
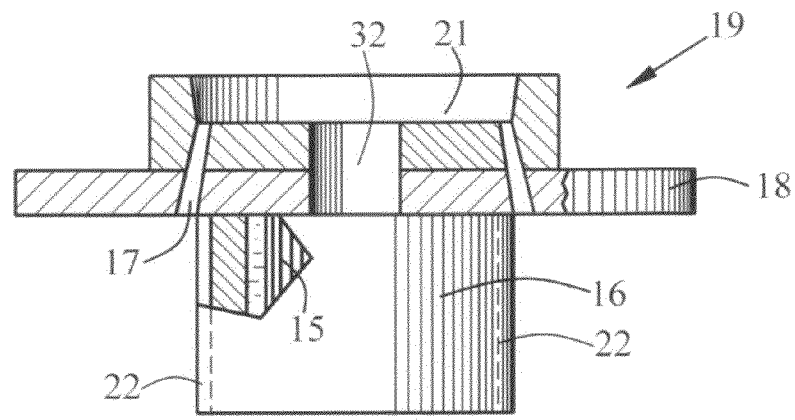
FIG. 6 is a partially cutaway side view of a recessed-hex sprocket retainer.
Figure 7:
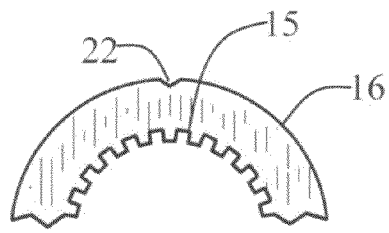
FIG. 7 is a fragmentary end view of a cylindrical extension of a sprocket retainer showing a lubrication groove which is shown also in the FIG. 4 and FIG. 6 drawings.
Figure 8:
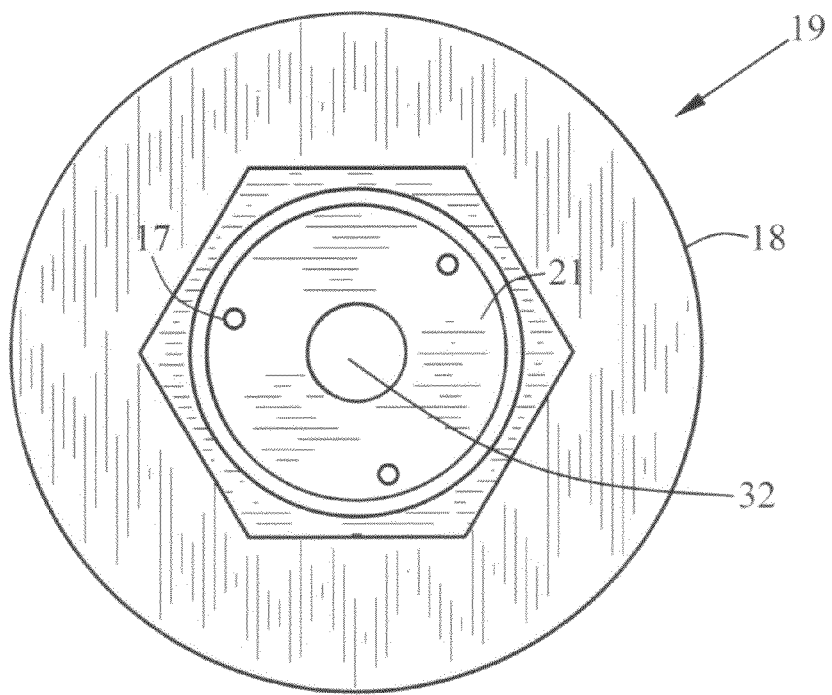
FIG. 8 is an end view of the recessed-hex sprocket retainer.

Referring to FIGS. 6-8, an optionally recessed hex sprocket retainer (19) has at least one retainer extension lubrication orifice (17) in fluid-conveyance communication from a bolt recess (21) in the recessed hex sprocket retainer (19) to the fluid groove (22) in the cylindrical retainer extension (16). The retainer-extension lubrication orifice (17) is preferably tapered outwardly from a minor diameter at the bolt recess (21) to a major diameter at the cylindrical retainer extension (16).

A flange-screw orifice (32) is extended from the bolt recess (21) to an inside periphery of the cylindrical extension (16).

Figure 9:
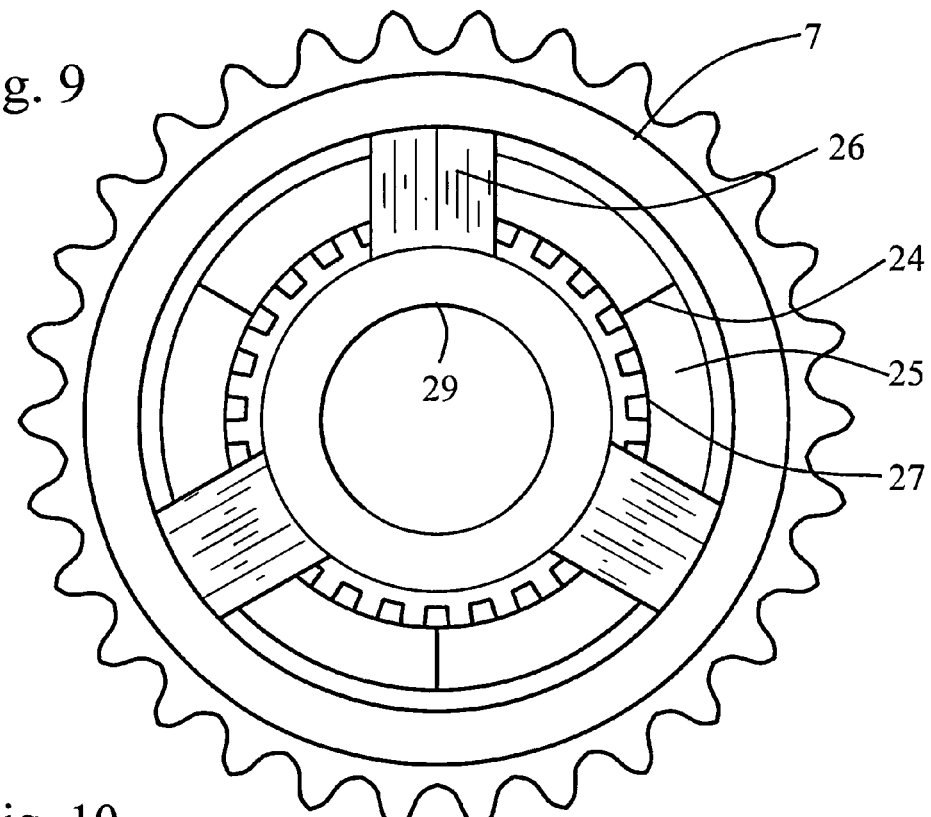
FIG. 9 is an end view of a compensator sprocket wheel and a sliding cam.
Figure 10:
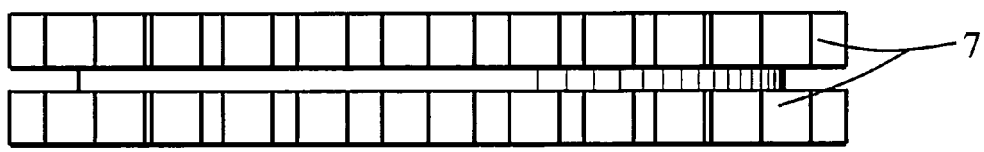
FIG. 10 is a top view of the compensator sprocket wheel.
Figure 11:
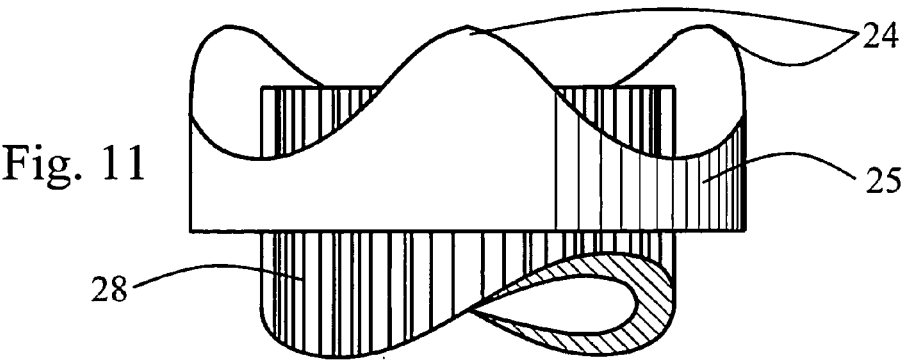
FIG. 11 is a side view of the sliding cam on a partially cutaway shaft extension.

Referring to FIGS. 9-11, peaks (24) of a sliding cam (25) are extended intermediate spokes (26) of the compensator sprocket wheel (7). The sliding cam (25) has a cam spline (27) with wear-resistance sliding contact on a shaft-extension spline (28) with lubricant conveyed from the lubricant-collection plate (2). The lubricant (not shown) can be optionally predetermined oil or a silicon-based lubricant having a lubricative consistence that prevents direct contact of sliding and rotating parts for extending wear life of the sliding and rotating contact of parts. Rotational contact of an inside periphery (29) of the compensator sprocket wheel (7) with an outside periphery of the cylindrical retainer extension (16) can be lubricated sufficiently for predeterminedly long use life with this lubricating system.

Figure 12:
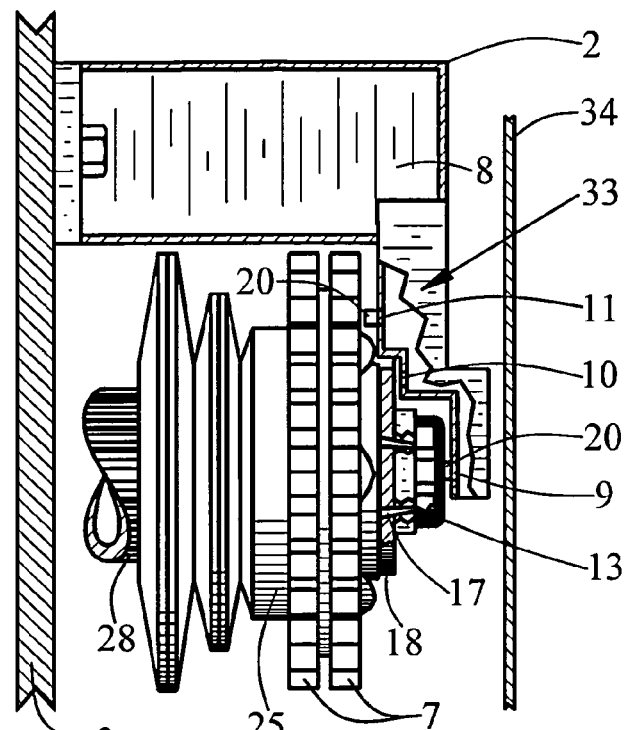
FIG. 12 is a partially cutaway top view of the lubricant-collection plate extended from an inside wall of a sprocket-gear housing in lubrication relationship to a partially cutaway primary drive compensator assembly.
Figure 13:
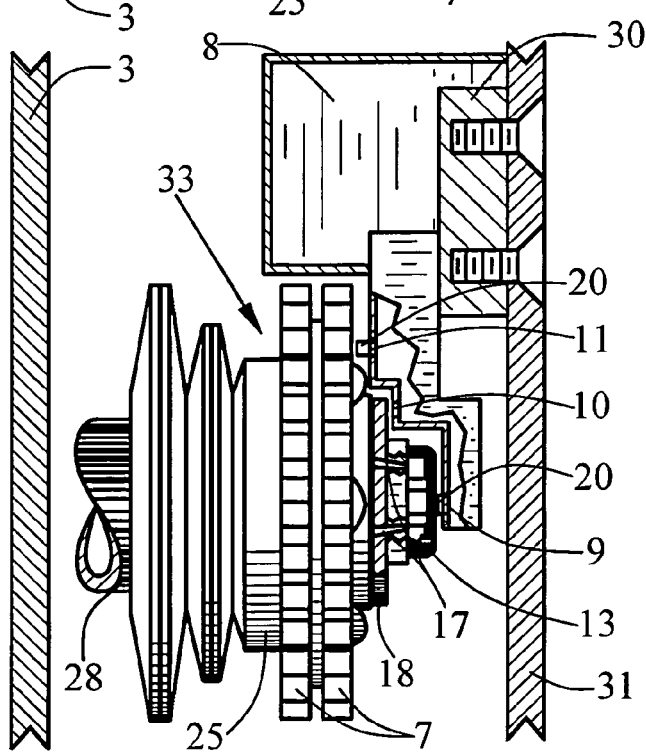
FIG. 13 is a partially cutaway top view of the lubricant-collection plate extended from a fortified outside wall of a sprocket-gear housing in lubrication relationship to the partially cutaway primary drive compensator assembly.

Referring to FIGS. 12-13, the lubricant-collection plate (2) can be an inside lubricant-collection plate (2) that is attachable to a motorcycle frame (not shown) at the inside wall (3) of the sprocket-gear housing (1). Optionally, an outside-wall lubricant-collection plate (30) can be attachable to a fortified outside wall (31) having sufficient rigidity to avoid vibration.

The inside lubricant-collection plate (2) and the outside-wall lubricant-collection plate (30) and a collection bay (8) for each can be sized and shaped to fit particular motorcycles, their sprocket-gear housings (1) and their positioning of the sprocket-wheel hub (33) in relationship to other parts of a motorcycle. Flexibility of design shape and size of the lubricant-collection plates (2) and (30) for particular motorcycles is illustrated by variableness of the drawings thereof.

Referring to FIGS. 14-15, the outside-wall lubricant-collection plate (30) can be attached to an unfortified outside wall (34) which can be fortified by a fortification cross plate (35) that is extended intermediate a top housing wall (36) and a bottom housing wall (37) on an inside surface of the unfortified outside wall (34).

A new and useful Motorcycle Compensator-Sprocket-Wheel-Hub Lubricating System having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A motorcycle primary drive compensator hub lubricating system comprising:
   a lubricant-collection plate extended from a wall of a sprocket-gear housing of a motorcycle, the lubricant-collection plate including:
   a collection bay positioned vertically under a sprocket-wheel chain for collecting lubricant carried by the sprocket-wheel chain from a bottom portion of the sprocket-gear housing about a large sprocket wheel and falling on the collection bay; and
   a fluid-conveyance communication conveying lubricant from the collection bay to:
   a retainer-lubrication outlet;
   a cam-lubrication outlet; and
   a spline-lubrication outlet for lubricating predetermined rotating-contact and sliding-contact parts of a compensator-sprocket-wheel hub, wherein the predetermined rotating-contact and sliding-contact parts of the compensator-sprocket-wheel hub include:
   a hex sprocket retainer having at least one retainer-extension lubricator orifice in fluid-conveyance communication from the hex sprocket retainer to an outside periphery of a cylindrical retainer extension; and
   the retainer-extension lubricator orifice being tapered predeterminedly with a taper minor diameter at an entrance from the hex sprocket retainer and a major taper diameter at an exit at the outside periphery of the cylindrical retainer extension of the hex sprocket retainer.

2. The motorcycle primary drive compensator hub lubricating system of claim 1 and further comprising:
   at least one fluid groove extended predeterminedly in the outside periphery of the cylindrical retainer extension for conveying lubricant from the retainer-extension lubricator orifice to the outside periphery of the cylindrical retainer extension.

3. The motorcycle primary drive compensator hub lubricating system of claim 1 and further comprising:
   a hex flange screw in a hex screw orifice having a hex head with predetermined height and width for acceptance of a socket wrench to rotate the hex flange screw in rotational opposition to a wrench engaged with the hex sprocket retainer for tightening and loosening the hex flange screw selectively.

4. A motorcycle primary drive compensator hub lubricating system comprising:
- an inside-wall lubricant-collection plate which includes the lubricant-collection plate attachable to a motorcycle frame proximate an inside wall of a sprocket-gear housing of a motorcycle;
- the inside-wall lubricant-collection plate including:
  - a collection bay positioned vertically under a sprocket-wheel chain for collecting lubricant carried by the sprocket-wheel chain from a bottom portion of the sprocket-gear housing about a large sprocket wheel and falling on the collection bay; and
  - a fluid-conveyance communication conveying lubricant from the collection bay to:
    - a retainer-lubrication outlet;
    - a cam-lubrication outlet; and
    - a spline-lubrication outlet for lubricating rotating-contact and sliding-contact parts of a compensator-sprocket-wheel hub, wherein the predetermined rotating-contact and sliding-contact parts of the compensator-sprocket-wheel hub include:
      - a hex sprocket retainer having at least one retainer-extension lubricator orifice in fluid-conveyance communication from the hex sprocket retainer to an outside periphery of a cylindrical retainer extension; and
      - the retainer-extension lubricator orifice being tapered predeterminedly with a taper minor diameter at an entrance from the hex sprocket retainer and a major taper diameter at an exit at the outside periphery of the cylindrical retainer extension of the hex sprocket retainer.

5. The motorcycle primary drive compensator hub lubricating system of claim 4 in which the hex sprocket retainer includes:
- a walled hex sprocket retainer having a circumferential containment wall extended orthogonally and designedly curved inwardly on the walled hex sprocket retainer for containment and direction of lubricant conveyed from the inside-wall lubricant-collector plate; and
- the walled hex sprocket retainer includes a retainer flange.

6. The motorcycle primary drive compensator hub lubricating system of claim 5 in which:
- the at least one retainer-extension lubricator orifice of the walled hex sprocket retainer in fluid-conveyance communication from within the circumferential containment wall to the outside periphery of the cylindrical retainer extension of the walled hex sprocket retainer.

7. The motorcycle compensator-sprocket-wheel-hub lubricating system of claim 6 and further comprising:
- at least one fluid groove extended predeterminedly in an outside periphery of the cylindrical retainer extension for conveying lubricant from the retainer-extension lubricator orifice to the outside periphery of the cylindrical retainer extension.

8. A method comprising the following steps for lubricating a compensator-sprocket-wheel hub of a motorcycle:
- positioning a lubricant-collection plate vertically under a sprocket chain intermediate a large sprocket wheel and a compensator sprocket wheel in a sprocket gear house, the lubricant-collection plate:
- including a collection bay;
- collecting lubricant carried by chain travel of a sprocket chain and falling in the collection bay;
- being slanted predeterminedly intermediate the large sprocket wheel and the compensator sprocket wheel for causing gravitational flow of lubricant in the lubricant-collection plate to:
  - a retainer-lubrication outlet;
  - a cam-lubrication outlet; and
  - a spline lubrication outlet for lubricating predetermined rotational-contact and sliding-contact parts of a compensator-sprocket-wheel hub, wherein the predetermined rotating-contact and sliding-contact parts of the compensator-sprocket-wheel hub include:
    - a hex sprocket retainer having at least one retainer-extension lubricator orifice in fluid-conveyance communication from the hex sprocket retainer to an outside periphery of a cylindrical retainer extension; and
    - the retainer-extension lubricator orifice being tapered predeterminedly with a taper minor diameter at an entrance from the hex sprocket retainer and a major taper diameter at an exit at the outside periphery of the cylindrical retainer extension of the hex sprocket retainer.

9. The method of claim 8 in which the hex sprocket retainer includes:
- a walled hex sprocket retainer having a circumferential containment wall extended orthogonally and designedly curved inwardly on the walled hex sprocket retainer for containment and direction of lubricant conveyed from the inside-wall lubricant-collector plate;
- the walled hex sprocket retainer includes a retainer flange;
- the at least one retainer-extension lubricator orifice of the walled hex sprocket retainer in fluid-conveyance communication from within the circumferential containment wall to the outside periphery of the cylindrical retainer extension of the walled hex sprocket retainer; and
- at least one fluid groove extended predeterminedly in the outside periphery of the cylindrical retainer extension for conveying lubricant from the retainer-extension lubricator orifice to the outside periphery of the cylindrical retainer extension.

* * * * *